United States Patent
Peng

(10) Patent No.: US 8,275,363 B2
(45) Date of Patent: *Sep. 25, 2012

(54) INQUIRING OF A PROTECTED COMMUNICATIONS SERVICES DATABASE TO ADDRESS CONCERNS OVER BLIND BASE STATION OPERATION IN CONFLICT WITH PROTECTED COMMUNICATIONS SERVICES

(75) Inventor: Zhen Ning Peng, Beijing (CN)

(73) Assignee: STMicroelectronics (Beijing) R&D Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/350,574

(22) Filed: Jan. 13, 2012

(65) Prior Publication Data

US 2012/0115524 A1 May 10, 2012

Related U.S. Application Data

(63) Continuation of application No. 12/112,969, filed on Apr. 30, 2008, now Pat. No. 8,099,093.

(30) Foreign Application Priority Data

Apr. 30, 2007 (CN) .......................... 2007 1 0103631

(51) Int. Cl.
*H04M 3/42* (2006.01)
(52) U.S. Cl. .................. 455/414.1; 455/424; 455/422.1; 455/63.1; 375/347; 370/229

(58) Field of Classification Search .................. 455/424, 455/522, 69, 414, 414.1; 370/332, 474; 375/242; 704/E19.006; 379/49
See application file for complete search history.

(56) References Cited

U.S. PATENT DOCUMENTS

| | | | |
|---|---|---|---|
| 6,081,713 A * | 6/2000 | Desgagne ...................... 455/436 |
| 6,097,773 A * | 8/2000 | Carter et al. .................. 375/347 |
| 8,099,093 B2 * | 1/2012 | Peng .............................. 455/424 |
| 2004/0179472 A1 * | 9/2004 | Khalilzadeh et al. ......... 370/227 |
| 2004/0209643 A1 * | 10/2004 | Welsh ........................ 455/556.1 |
| 2005/0107039 A1 * | 5/2005 | Lindoff et al. ................ 455/63.1 |
| 2005/0144468 A1 | 6/2005 | Northcutt et al. |
| 2005/0195739 A1 * | 9/2005 | Grover et al. ................. 370/225 |
| 2007/0184824 A1 * | 8/2007 | Nylander et al. .......... 455/422.1 |
| 2007/0249341 A1 * | 10/2007 | Chu et al. ..................... 455/434 |

* cited by examiner

*Primary Examiner* — Jean Gelin
*Assistant Examiner* — Mahendra Patel
(74) *Attorney, Agent, or Firm* — Gardere Wynne Sewell LLP

(57) ABSTRACT

A database stores updated information concerning protected communications services. A base station for a coexisting, and potentially co-channel, non-protected communications service makes an inquiry of the database requesting an identification of geographically relevant protected services along with the database stored information pertinent to each of those identified protected services. The returned information is processed by the base station to determine what channels are available for use by the non-protected service. An available channel is identified by the base station as the working channel for the non-protected service and the base station initiates a process to establish a communications network using the non-protected service and the selected working channel.

20 Claims, 2 Drawing Sheets

INQUIRING OF A PROTECTED COMMUNICATIONS SERVICES DATABASE TO ADDRESS CONCERNS OVER BLIND BASE STATION OPERATION IN CONFLICT WITH PROTECTED COMMUNICATIONS SERVICES

PRIORITY CLAIM

This application for patent is a continuation of U.S. application patent Ser. No. 12/112,969 filed Apr. 30, 2008 (now U.S. Pat. No. 8,099,093) which claims the benefit of Chinese Application for Patent No. 200710103631.6 filed Apr. 30, 2007, the disclosures of which are hereby incorporated by reference.

BACKGROUND OF THE INVENTION

1. Technical Field of the Invention

The present invention relates to co-channel wireless communications systems and, in particular, to addressing coexistence problems causing harmful interference amongst such co-channel wireless communications systems.

2. Description of Related Art

Reference is now made to FIG. 1 wherein there is schematically illustrated coexisting co-channel wireless communications systems. A first wireless communications system 10 provides a service A from a broadcast station 12 on a certain channel K. The service A is a "protected wireless telecommunication service." By this it is meant that the channel K on which service A is provided is reserved for Service A within a predetermined range (distance) of the broadcast station 12 without competition or interference from other services. An example of a protected service such as service A would include a television (TV) broadcast service or an FM radio broadcast service.

A second wireless communications system 20 provides a service B from a broadcast station (base station) 22 on a selected one or more of a plurality of channels, wherein a selectable one of the channels includes the certain channel K used by service A. The service B is typically not a protected wireless telecommunication service. Service B must obey at least the following rule with respect to service A: service B cannot make a harmful intrusion to any protected service such as service A. This means that service B is allowed to use (operate on) channel K, which is also being used by service A, only when such operation will not cause a harmful interference to service A. If such a harmful interference arises with respect to the protected service A, service B is obligated to leave channel K immediately. It is the responsibility of service B, or the person/entity who provides service B, to ensure that the foregoing rule against interfering with protected service A is not being violated. An example of a non-protected service such as service B would include a point-to-multipoint wireless telecommunication network (such as an IEEE P802.22 Wireless Regional Area Network (WRAN)).

With respect to a typical point-to-multipoint wireless telecommunication network (such as an IEEE 802.22 WRAN), the base station (BS) 22 manages operation of the established wireless network in communication with proximate network members. In this regard, it is the responsibility of the base station 22 to determine which of the plurality of channels is selected as the working channel, as well as how communication opportunities are allocated to the members of the network. It is accordingly the responsibility of the base station 22 to monitor the spectrum situation, detect the harmful intrusion to the protected service A and if such interference occurs, command all the members of its network to leave the current working channel K for another working channel.

One known mechanism for spectrum monitoring by the base station involves providing an interference detection capability within the base station 22 itself. The interference detection capabilities of the base station 22 are, however, limited. Thus, there exists a detection problem with respect to the use of the base station 22, since in some situations the base station 22 may not be able to discover all instances of harmful interference to protected service A.

Another known mechanism for spectrum monitoring by the base station involves the use of the members of the network. In this solution, the members of the network monitor for interference on channel K and make reports back to the base station 22. For example, each network member operating on the working channel monitors the current interference situation and where an unacceptable level of interference is found, the member sends a report to the base station 22 to inform the base station about this interference. The base station 22 collects the detection reports from its network members and processes the reports to determine whether the rule against interfering with service A is being violated (for example, because protected service A has been assigned to use working channel K). Thus, in this mechanism the base station 22 of service B at least partially depends on its network members to detect instances of harmful intrusion on or to protected services.

In connection with the network member mechanism, it will noted that in the absence of effective network members in a position to monitor for interference and generate reports back to the base station 22, the base station 22 will potentially be unaware of its harmful intrusion on or to the protected service A. This is referred to as the "blind base station" problem since the base station is blind to the fact that its choice of channel K is potentially interfering with service A's use of channel K. A better understanding of how this problem occurs may be obtained by reference to FIG. 1.

Consider first the existence of two service B network members 24 and 26 which are positioned within the noise limited contour 28 of the service B base station 22. Network member 24 receives service B outside of the service A coverage area 30 (i.e., the area where service A can be sensed by, for example, network members for service B). Thus, network member 24 will not sense interference from service A and thus will not be in a position to discover and make an interference report regarding channel K to the base station 22. With respect to network member 26, however, it receives service B within the service A coverage area 30. At this location, network member 26 is positioned to sense interference from service A and thus can make interference reports regarding channel K to the base station 22. In this situation, the base station 22 is not blind because at least one network member (i.e., network member 26) is positioned within the noise limited contour 28 of service B such that it can detect interference from service A and make appropriate reports to the base station 22. The base station 22, in response to the interference reports from network member 26, can determine or infer that the rule against interfering with service A is being violated by its co-use of channel K and act to move service B off of the co-channel K.

Assume now that there are no network members (such as network member 26 in the foregoing example) which are positioned both within the noise limited contour 28 of service B and the service A coverage area 30 (see, shaded region 32). Or alternatively, that such network members are present in region 32 but are not operating properly at least with respect to the functionality for detecting interference. The service B has a coverage area 34 (i.e., the area where service B can be sensed by, for example, network members for service A) which overlaps with the service A coverage area 30 and further, and more importantly, overlaps with the noise limited contour 36 of the service A broadcast station 12 (see, shaded region 38). Consider now a service A receiver 40 located within the shaded region 38. This receiver 40 will have its service A reception interfered with by service B communications (due to the overlapping service B coverage area 34). However, because service B has no network members located within the shaded region 32 (or the members are not operating properly to detect interference), the base station 22 will not receive any network member reports of interference and is thus blind to the potential or actual interference it is causing to the protected service A in the shaded region 38.

In general, the blind base station problem exists when each of the following four conditions are met at the same time: 1. service B and service A work on the same channel (such as channel K) at the same time; 2. the service B coverage area 34 overlaps with the service A noise-limited contour 36 (i.e., the radius of service B's coverage area plus the radius of service A's noise limited contour exceeds the distance between the two broadcast/base stations); 3. the service B base station is outside of the service A coverage area 30 (i.e., the distance between the two broadcast/base stations is greater than the radius of service A's coverage area); and 4. there is no service B network member (or such member is not working properly) in the overlapping zone (region 32) between service B's noise-limited contour 28 and service A's coverage area 30.

A need accordingly exists in the art to address the blind base station issue which can arise in connection with coexisting services provided by co-channel wireless telecommunication systems.

SUMMARY OF THE INVENTION

In an embodiment, a base station is configured to provide a non-protected wireless bi-directional telecommunication service operable on a selectable one of a plurality of frequencies. The plurality of frequencies include frequencies which are reserved for use by a protected wireless unidirectional broadcast service in a given geographic area. The base station is configured for operation, prior to establishing the non-protected wireless bi-directional telecommunication service using said selectable one of the plurality of frequencies, to access a database to retrieve information stored therein concerning the protected wireless unidirectional broadcast service and evaluate the retrieved information in connection with selecting one of the plurality of frequencies and establishing the non-protected wireless bi-directional telecommunication service using the selected one of the plurality of frequencies in a manner which would not interfere with a frequency used in the given geographic area by the at least one protected wireless unidirectional broadcast service.

In another embodiment, a method for a base station to establish a service network providing a non-protected wireless bi-directional telecommunication service operable on a selectable one of a plurality of frequencies comprises: inquiring by the base station of a protected services database to retrieve stored information concerning the existence and operation of at least one protected wireless unidirectional broadcast service operating on a reserved one of said plurality of frequencies in a given geographic area; evaluating the retrieved information; selecting one of the plurality of frequencies based on the evaluation which would not interfere with the frequency reserved in the given geographic area for use by the at least one protected wireless unidirectional broadcast service; and establishing the non-protected wireless bi-directional telecommunication service using the selected one of the plurality of frequencies.

In yet another embodiment, a base station is configured to provide a non-protected wireless bi-directional telecommunication service operable on a working channel that is reserved for use by at least one protected wireless unidirectional broadcast service. The base station is configured for operation, prior to establishing the non-protected wireless bi-directional telecommunication service, to inquire of a protected service database for the identification of protected wireless unidirectional broadcast services which could potentially be adversely affected by base station establishment of the non-protected wireless bi-directional telecommunication service on said working channel, to evaluate a received database response to the inquiry and to determine at least one available working channel for the non-protected wireless bi-directional telecommunication service which would not interfere with the identified protected wireless unidirectional broadcast services.

In another embodiment, a method for a base station to establish a wireless regional area network (WRAN) service in a geographic area having at least one protected wireless unidirectional broadcast service selected from the group consisting of a broadcast television service and a broadcast radio service comprises: inquiring by the base station of a protected services database to identify any protected wireless unidirectional broadcast services in the geographic area of the base station which could potentially be adversely affected by base station establishment of the WRAN service, wherein working channels for the WRAN service are shared in common with working channels for the protected wireless unidirectional broadcast services; and evaluating the identified protected wireless unidirectional broadcast services in order to determine at least one available working channel for use by the WRAN service which would not interfere with the at least one protected wireless unidirectional broadcast service.

BRIEF DESCRIPTION OF THE DRAWINGS

A more complete understanding of the invention may be obtained by reference to the accompanying drawings wherein.

DETAILED DESCRIPTION OF THE DRAWINGS

Figure 2:
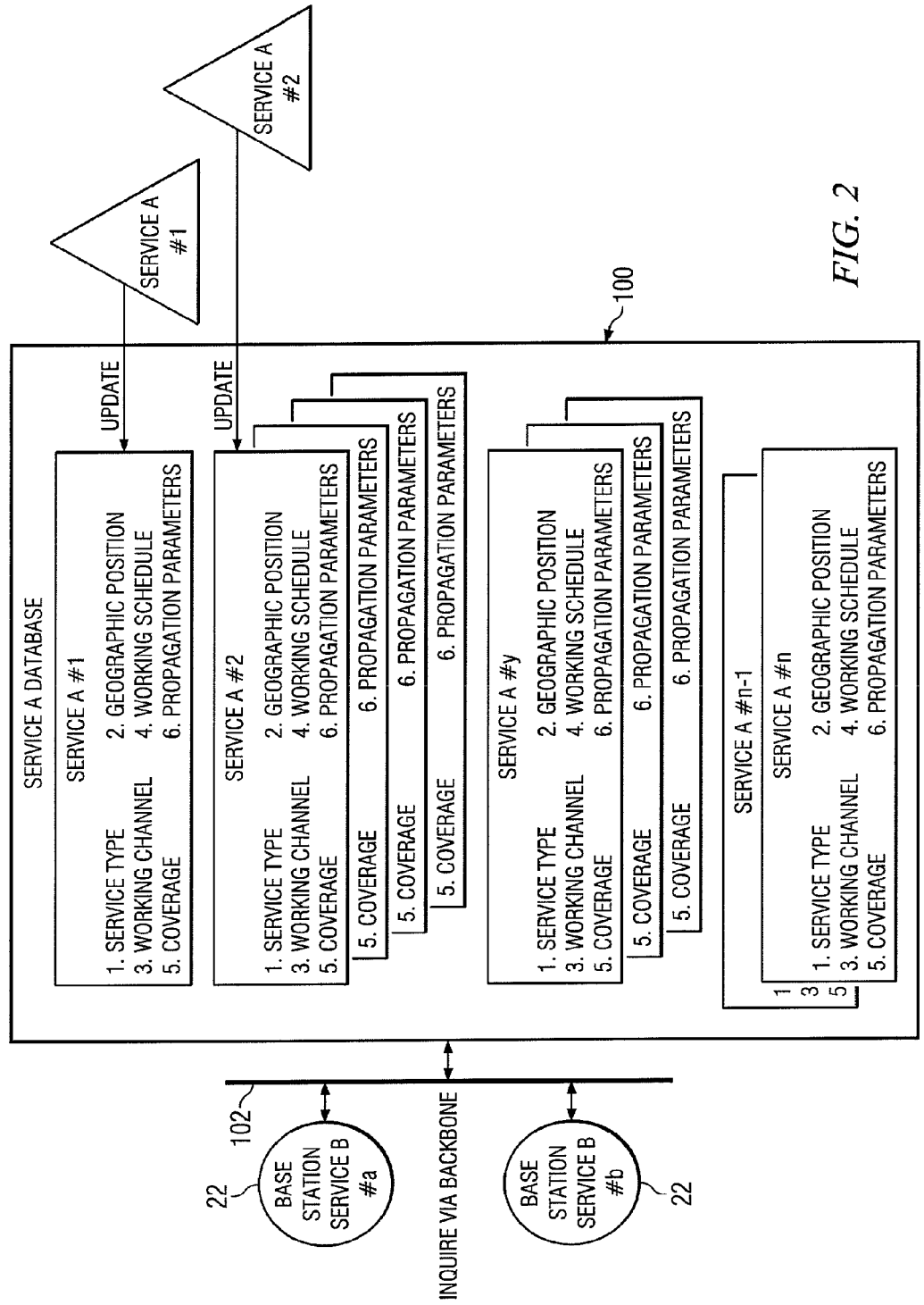
FIG. 2 is a block diagram of a system solution to the blind base station problem.

Reference is now made to FIG. 2 wherein there is shown a block diagram of a system solution to the blind base station problem. A database 100 is established to maintain updated information concerning the existence and operation of protected services (such as the protected services A). Responsibility for providing and updating the information stored in the database 100 preferably rests with the providers of the protected services A, although the service B provider may take this responsibility or it could be contracted out to a third party. The stored information relating to each protected service would generally include information concerning the properties, working channel, working schedule, geographical position of the broadcast station, and the coverage radius (i.e., coverage area 30) of the service. More detailed information would comprise the following information for each protected service: service type, working channel, coverage data, geographic position of broadcast station, working schedule and propagation parameters of the service radio frequency transmission.

In the scenario where the protected services A were television broadcast services, the database 100 would store the broadcast information relating to each television channel. This information would include at least the channel used for broadcast transmission, the location of the broadcast station (transmit antenna), coverage radius for broadcast transmissions, operating schedule, and broadcast propagation information.

The database 100 is connected to the service B base stations 22 over the conventional backbone communications network 102 for service B which interconnects the base stations 22 to each other and to any necessary centralized communications infrastructure (such as a router, switch, interface, billing system and the like).

Each time a base station 22 of service B wants to establish its network, it first inquires of the database (via wired backbone communications network 102). This inquiry asks the database 100 to return the stored information relating to any protected services which could be affected by the contemplated network to be established by base station 22. Thus, it will be noted that an initial filtering of the stored information for the protected services A is performed by the database 100 in response to the base station 22 inquiry. Those protected services A known to the database 100 which would not potentially be affected by establishment of the contemplated service B (for example, due to geographical issues, working channel issues, working schedule issues, and the like) are filtered out and the information concerning those services are not returned to the inquiring base station 22.

In a preferred implementation, the level of filtering performed by the database 100 in response to the inquiry would filter out those protected services A which are not geographically relevant to the base station 22 and the proposed establishment of a service B network. Thus, the protected services A stored in the database 100 whose broadcast stations 12 are located too far away from base station 22 will be filtered out, leaving only those services A whose broadcast stations 12 neighbor the base station 22 (for example, those which have a service coverage area 30 that overlaps one or more of the service B coverage area 34 and/or service B noise limited contour 28).

Thus, what is returned to the inquiring base station 22 is an identification of the geographically relevant services A along with the database stored information pertinent to each of those identified services. The base station 22 then evaluates the returned information concerning the relevant services A. This evaluated information comprises the updated attributes and parameters of the relevant services A. As discussed above, the returned information relating to each of the services A includes service type, working channel, coverage data, geographic position of broadcast station, working schedule and propagation parameters of the service radio frequency transmission. From an evaluation of this information, the base station 22 can determine what working channels are available (as well as what would be the available working period for each of these channels) for potential use in connection with the contemplated service B network to be established by base station 22. The base station 22 accordingly can structure the contemplated service B network to be established in a manner which would avoid the "blind base station" problem with respect to service A.

Importantly, it will be noted that with the use and evaluation of the information stored in the database 100, the blind base station issue can be avoided by the base station 22 in establishing service B without requiring network members (such as members 24 and 26) to monitor for interference. It will be understood that the conventional prior art process for network member monitoring of interference can also be used after the service B network is established to confirm that no interference issues with respect to protected services exist.

Figure 1:
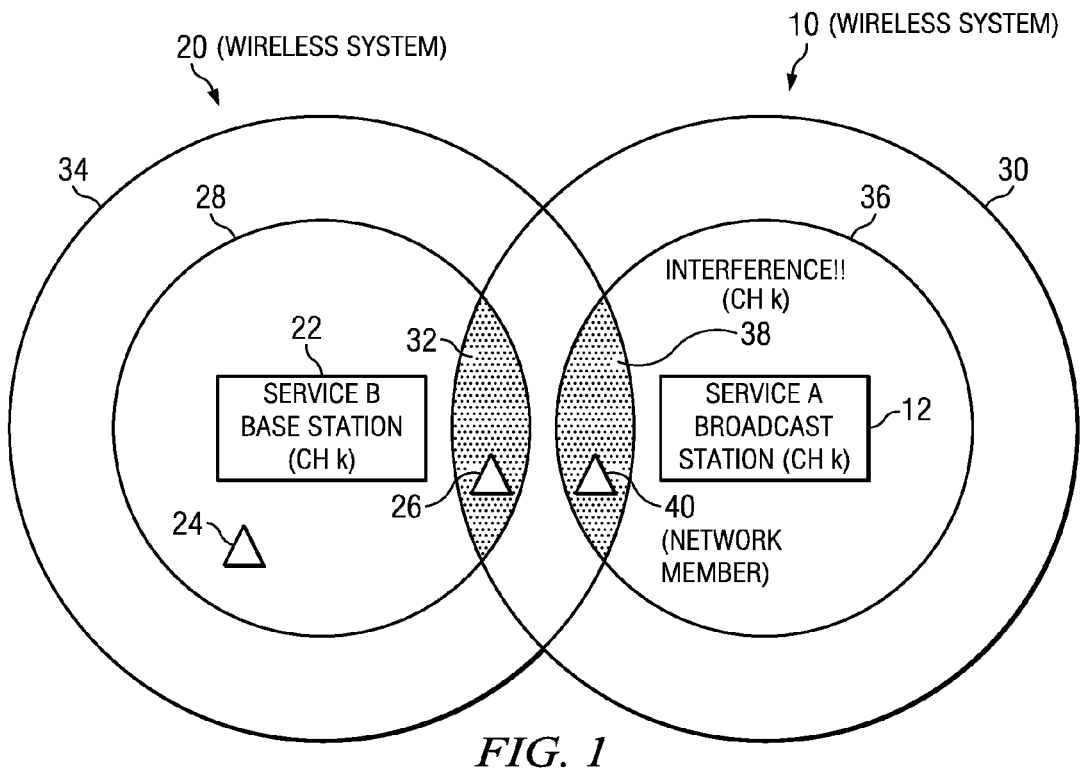
FIG. 1 schematically illustrates coexisting co-channel wireless communications systems and the way in which the blind base station problem arises.
Figure 3:
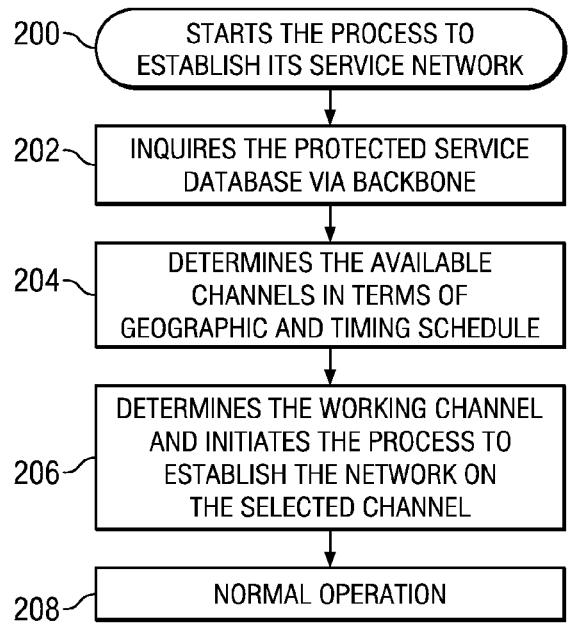
FIG. 3 is a flow diagram for base station operation.

Reference is now made to FIG. 3 wherein there is shown a flow diagram for base station operation. In step 200, the base station starts the process to establish its service B network. In step 202, the base station make an inquiry of the database 100. As discussed above, the database responds to the inquiry by returning to the base station with an identification of the geographically relevant protected services A along with the database stored information pertinent to each of those identified protected services. In step 204, the base station processes the returned information and determines what channels are available for use by the service B. This determination considers, at least, geographic and timing schedule information for the geographically relevant protected services A identified in response to the step 202 inquiry. Having identified available channels in step 204, the base station next, in step 206, determines the working channel for the service B and initiates the process to establish the network for service B using the determined working channel. Lastly, in step 208, the base station commences normal operation of the service B.

The present invention may be better understood through the analysis of a concrete example. As is known, over-the-air broadcast television channels are separated by unused frequencies. This "white space" in the television broadcast spectrum varies in size and configuration with the number of channels present in a given geographic locale. The existence of the white space creates opportunities for other applications to make use of this otherwise unused spectrum.

In October 2004, the Federal Communication Commission (FCC) issued a Notice of Proposed Rule Making to open the 54-698 MHz portion of the television spectrum for unlicensed usage. As a step in putting any unused television channels (the white space) within a geographic locale to practical use, standards are being considered to enable the deployment of wireless regional area networks (WRAN), which would make use of the unused television channels in a manner which would not interfere with the licensed services (i.e., the protected services) now operating in the television spectrum. There may also exist situations where co-channel use would be possible.

Through the use of the database 100 of FIG. 2 and the process of FIG. 3, a base station providing a fixed, point-to-multipoint, wireless regional area network can establish service on a selected one of the television channels in a manner which would not cause harmful interference to the licensed incumbent services in the television broadcast bands. The database 100 would store the pertinent broadcast information for each of the licensed television stations. This information may be sorted or arranged in the database by geographic region (such as city, state, metropolitan area, and the like). The base station which would provide the WRAN in the 54-698 MHz portion of the television spectrum would first inquire of the database to identify the television services which are geographically relevant to the location of the base station. The broadcast information of each of those identified services would then be evaluated to identify available channels for the WRAN. One of those channels would then be selected and the WRAN established by the base station on that channel. Importantly, based on the base station analysis of the protected services information retrieved from the database 100, the base station may be permitted co-channel usage of a television channel provided the analysis as described above indicates that there is no blind base station issue.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A system configured to provide a non-protected wireless bi-directional telecommunication service operable on a plurality of frequencies, wherein the plurality of frequencies include frequencies which are reserved for use by a protected wireless unidirectional broadcast service in a given geographic area, comprising:
 a base station configured for operation, prior to establishing the non-protected wireless bi-directional telecommunication service using said plurality of frequencies, to:
  access a database to retrieve information stored therein concerning the protected wireless unidirectional broadcast service,
  evaluate the retrieved information in connection with selecting frequencies from the plurality of frequencies, and
  establish the non-protected wireless bi-directional telecommunication service using the selected frequencies in a manner which would not interfere with a frequency used in the given geographic area by the at least one protected wireless unidirectional broadcast service.

2. The system of claim 1,
 wherein the information stored in the database comprises: working channel identification, broadcast station location, and
 protected service coverage area for the at least one protected wireless unidirectional broadcast service, and
 wherein said base station is further configured to make a working channel selection for the non-protected wireless bi-directional telecommunication service based on the retrieved working channel identification, broadcast station location and protected service coverage area information for the at least one protected wireless unidirectional broadcast service.

3. The system of claim 2, wherein the information stored in the database further comprises coverage data and radio frequency propagation parameters relating to the at least one protected wireless unidirectional broadcast service.

4. The system of claim 1, wherein the evaluation performed by the base station comprises determining at least one available working channel for the non-protected wireless bi-directional telecommunication service based on the retrieved information concerning the existence and operation of at least one protected wireless unidirectional broadcast service.

5. The system of claim 4, wherein the retrieved information which is evaluated in determining by the base station comprises geographic and timing information for the at least one protected wireless unidirectional broadcast service.

6. The system of claim 4, wherein the base station is further configured to establish a service network providing the non-protected wireless bi-directional telecommunication service on the determined at least one available working channel.

7. A method for a base station to establish a service network providing a non-protected wireless bi-directional telecommunication service operable on a plurality of frequencies, comprising:
 inquiring by the base station of a protected services database to retrieve stored information concerning the existence and operation of at least one protected wireless unidirectional broadcast service operating on a reserved one of said plurality of frequencies in a given geographic area;
 evaluating the retrieved information;
 selecting frequencies from the plurality of frequencies based on the evaluation which would not interfere with the frequency reserved in the given geographic area for use by the at least one protected wireless unidirectional broadcast service; and
 establishing the non-protected wireless bi-directional telecommunication service using the selected frequencies.

8. The method of claim 7, wherein the stored information comprises:
 working channel identification,
 broadcast station location, and
 protected service coverage area for the at least one protected wireless unidirectional broadcast service, and
 wherein evaluating comprises making a working channel selection for the non-protected wireless bi-directional telecommunication service based on the retrieved working channel identification, broadcast station location and protected service coverage area information for the at least one protected wireless unidirectional broadcast service.

9. The method of claim 8, wherein the stored information further comprises coverage data and radio frequency propagation parameters relating to the at least one protected wireless unidirectional broadcast service.

10. The method of claim 7 wherein evaluating comprises determining at least one available working channel for the non-protected wireless bi-directional telecommunication service based on the retrieved information concerning the existence and operation of at least one protected wireless unidirectional broadcast service.

11. The method of claim 10, wherein the retrieved information which is evaluated in making the determination comprises geographic and timing information for the at least one protected wireless unidirectional broadcast service.

12. The method of claim 10, wherein establishing the service network comprises providing the non-protected wireless bi-directional telecommunication service on the determined at least one available working channel.

13. A system configured to provide a non-protected wireless bi-directional telecommunication service operable on a working channel that is reserved for use by at least one protected wireless unidirectional broadcast service, comprising:
 a base station configured for operation, prior to establishing the non-protected wireless bi-directional telecommunication service, to:
  inquire of a protected service database for the identification of protected wireless unidirectional broadcast services which could potentially be adversely affected by base station establishment of the non-protected wireless bi-directional telecommunication service on said working channel,
  evaluate a received database response to the inquiry, and determine at least one available working channel for the non-protected wireless bi-directional telecommunication service which would not interfere with the identified protected wireless unidirectional broadcast services.

14. The system of claim 13, wherein the database response identifies any protected wireless unidirectional broadcast service which is geographically relevant to the base station for the non-protected wireless bi-directional telecommunication service.

15. The system of claim 14, wherein the non-protected wireless bi-directional telecommunication service is wireless regional area network (WRAN) service and the protected wireless unidirectional broadcast service is selected from the group consisting of a broadcast television service and a broadcast radio service.

16. A method for a base station to establish a wireless regional area network (WRAN) service in a geographic area having at least one protected wireless unidirectional broadcast service selected from the group consisting of a broadcast television service and a broadcast radio service, comprising:
inquiring by the base station of a protected services database to identify any protected wireless unidirectional broadcast services in the geographic area of the base station which could potentially be adversely affected by base station establishment of the WRAN service, wherein working channels for the WRAN service are shared in common with working channels for the protected wireless unidirectional broadcast services; and
evaluating the identified protected wireless unidirectional broadcast services in order to determine at least one available working channel for use by the WRAN service which would not interfere with the at least one protected wireless unidirectional broadcast service.

17. The system of claim 1, further comprising: the database configured to store information concerning protected wireless unidirectional broadcast services.

18. The system of claim 1, further comprising: wireless network members operable within a service area of said base station for bidirectional communication using the selected frequencies.

19. The system of claim 13, further comprising: the protected service database configured to store information concerning identification of protected wireless unidirectional broadcast services.

20. The system of claim 13, further comprising: wireless network members operable within a service area of said base station for bidirectional communication using the selected working channel.

* * * * *